(12) United States Patent
Boeckmann

(10) Patent No.: US 7,368,831 B1
(45) Date of Patent: May 6, 2008

(54) POWER CONVERTER FEEDBACK CIRCUIT

(75) Inventor: Eduard F. Boeckmann, Huntsville, AL (US)

(73) Assignee: 3DLabs, Inc., Ltd, Hamilton (BM)

( * ) Notice: Subject to any disclaimer, the term of this patent is extended or adjusted under 35 U.S.C. 154(b) by 327 days.

(21) Appl. No.: 10/657,053

(22) Filed: Sep. 5, 2003

(51) Int. Cl.
*H02J 3/00* (2006.01)
(52) U.S. Cl. ............................................. 307/31
(58) Field of Classification Search ............... 307/31
See application file for complete search history.

(56) References Cited

U.S. PATENT DOCUMENTS 5,257,180 A * 10/1993 Sashida et al. .............. 363/71
6,465,992 B2 * 10/2002 De Groot .................... 323/222
2005/0141246 A1 * 6/2005 Balakrishnan et al. ........ 363/16

FOREIGN PATENT DOCUMENTS

JP          06038537 A  * 10/1994

* cited by examiner

*Primary Examiner*—Michael Sherry
*Assistant Examiner*—Dru Parries
(74) *Attorney, Agent, or Firm*—Groover & Associates

(57) ABSTRACT

An apparatus for sensing and controlling remote load voltages, the apparatus includes a power converter, a plurality of remote loads, each remote load located in a loop connected to the power converter, and a feed back loop connected to the power converter, and physically adjacent to the power converter, wherein the feed back loop further comprises a first path and a second path, with the first path and the second path in parallel.

20 Claims, 1 Drawing Sheet

POWER CONVERTER FEEDBACK CIRCUIT

BACKGROUND OF THE INVENTION

1. Field of the Invention

The invention relates generally to the field of power conversion, more specifically the invention relates to control of a power converter.

2. Description of the Related Art

Early high frequency switching power conversion devices operated without feedback or in an open-loop, "chopper", switch-mode. Later, it was learned that output regulation could be improved by adding a sense point at the converter output. By using the signal at the sense point, the high frequency switch duty cycle can be increased or reduced depending upon whether the output voltage was lower or higher than a desired load voltage.

The common method of voltage feedback control consists of feeding a feedback signal into a gain-compensated operational amplifier that compares the signal to a precision reference. Any deviation of the signal from the reference is amplified by the amplifier (usually referred to as the error amplifier) at high gain and then output to a switching regulation control circuit. The switching regulation control unit adjusts the switching duty cycle by an amount controlled by an error signal resulting from the demand or lack of demand for power output. This is usually accomplished by mixing the error amplifier output signal with a ramp oscillation signal resulting in a pulse with a width controlled by the error signal. This pulse is then used to modulate the switch on-time and thereby control the duty cycle and the output voltage of the converter. This technique is called pulse width modulation (PWM).

Other techniques for voltage feedback control add additional signals to the output of the error amplifier before it produces the final drive pulse (but not before the input to the error amplifier.) These additional signals are, for example, signals representing a switch peak current. If the switch exceeds a certain current threshold, the drive pulse would be terminated. This method is called current mode control, and the converter still uses the external voltage feedback control loop. Other techniques add signals representing output inductor currents for current sharing in so-called multi-phase converters.

Regardless of the type of design of a switching converter, there is still a basic problem when a remote load voltage is sensed with a feedback loop, because the voltage at a remote load is usually less than the voltage regulated at the terminals of the converter due to a drop in transmission line voltage. Some attempts have been made to sense the remote load voltage, via a signal transmission line, to regulate the converter to provide the correct voltage at the load. However, this approach introduces a new problem in that the voltage signal fed back from the load is delayed, and possibly phase shifted, from the actual signal at the load due to the long transmission line used to feedback the voltage signal.

Furthermore, when remote sensing is not at the power converter's terminals, the terminals of the power converter can swing wildly in response to the remote load demands. If other loads were connected to the same converter, but not as far away as the remote sensing, these loads could suffer from over-voltage excursions or even continuous over-voltage conditions due to the sensing at the farthest remote load (this is called a multiple load problem.) And even worse, due to the delay and phase shift of the transmission lines in the complete circuit, the converter can become unstable due to inadequate overall feedback phase margin.

Most AC to DC converters have primary to secondary side isolation for safety reasons, and usually the voltage sense feedback loop contains an isolation device such as an optically isolated coupler in an integrated circuit to provide the required safety isolation. Unfortunately, this feature does not help to reduce the remote sensing problem. Still there is a need to sense voltage at remote loads without introducing instability.

Another refinement of the remote sensing technique is also introduced where both the remote voltage and the remote common potential signals are fed back as a type of differential feedback signal. This refinement has the advantage of rejecting common mode noise, but it does not address the phase shifting, delay, and multiple load control problem associated with remote sensing.

SUMMARY OF THE INVENTION

The invention employs a fast feed back loop near the output terminals of the power converter and is useful in a circuit with distributed loads in different regions. The distributed loads create a voltage sensing problem because the signal suffers delay problem besides being subject to noise along its path.

In one embodiment, the invention is an apparatus for sensing remote load voltages that has a power converter, a plurality of remote loads, with each remote load located in a loop connected to the power converter, and a feed back loop connected to the power converter, the feed back loop being physically adjacent to the power converter, wherein the feed back loop further comprises a first path and a second path, and the first path and the second path are in parallel.

Each path may include a low-pass filter, a high-pass filter, a band-pass filter, or a capacitor-resistor network.

DETAIL DESCRIPTION OF THE INVENTION

Figure 1:
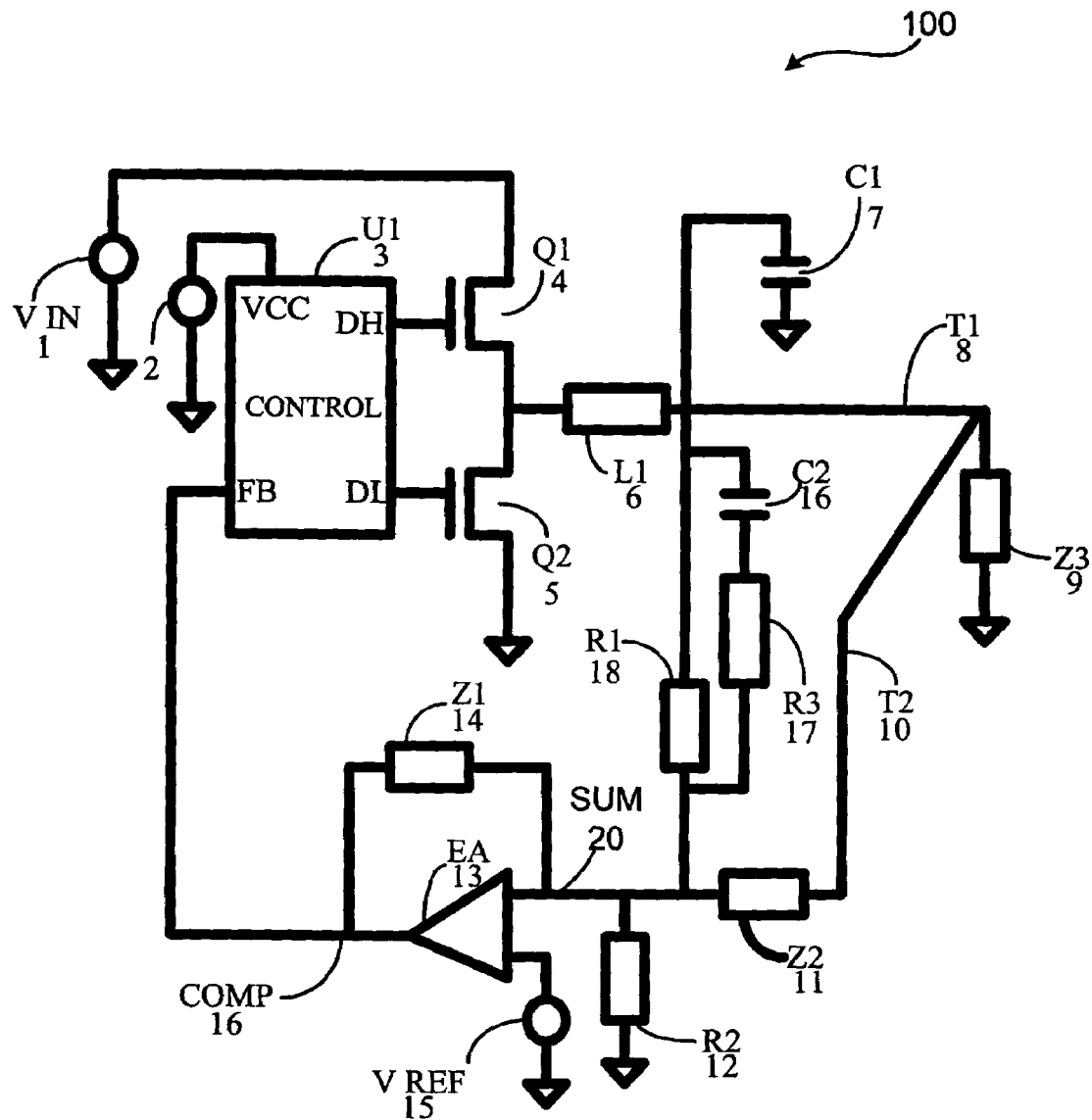
FIG. 1 illustrates a schematic diagram of a circuit according to the invention.

In one embodiment, the present invention is a circuit for improving feedback control of switch-mode power converters. In this embodiment, a main output (remote sense feedback loop) is treated as one information channel or critical point to be considered when controlling the converter. Other channels of information or critical points can be implemented such that, when properly utilized, the invention will improve or protect the system from instability caused by delayed, phase shifted, or discrepant data from only one feedback signal.

Examples of other channels of information include other load points, either not as remote or more remote, as well as the output terminals of the converter at its physical location, internal converter inductor voltages, etc. These channels of information can be utilized to precisely control a remote load voltage and prevent the converter terminals to swing wildly in voltage that might disturb other loads, especially if the remote load is only one of several loads.

The invention solves the problem of monitoring multiple critical points with use of standard "off-the-shelf" integrated circuit controllers, and thus eliminating the need for special control integrated circuits that could assess all channels of information or monitor all critical points (load points, converter terminals, etc.).

In the invention, multiple critical points, including remote and nearby loads, and the converter terminal voltage or inductor voltages, can be monitored by controlled impedance loops from a summing node of an error amplifier to each critical point. The impedance and hence the gain of each control loop is set with a separate resistor-capacitor network close to the summing node for each critical point.

By setting appropriate loop impedances (or gains) for each loop according to its weighted importance in the system, the converter can be reliably controlled and the optimum performance for the system can be achieved. The impedance of each loop is set according to the desired relative gain of each loop according to its importance relative to other critical points being sensed. The lower the impedance of a loop, the higher its relative gain will be in the system of all loops. For example, if load point number one is critical in its DC value (requiring tight regulation of say 1%) and load point number two is not very critical (maybe only needing regulation to say 10%), the impedance of load point number one in loop one could be set at, for example, 100 ohms vs. 1000 ohms for loop two.

Computer simulations of the over-all gain and phase of a typical system show that phase margin and bandwidth can be controlled, or even improved with the invention despite multiple of feedback loops that may be implemented.

The invention may function as a summing amplifier with certain summing impedances for each feedback loop. Each loop from each critical voltage point to be controlled goes to its own lumped impedance before reaching the summing node of the error amplifier. The summing amplifier, in this case an error amplifier, has a gain compensation or local feedback RC network with impedance Zf. Assume that the voltage at each critical point causes a signal current to flow through its feedback loop and through its specific loop impedance to the summing node of the error amplifier. Call each current i1, i2, i3, etc., up to N loops in the design. It can be shown that the output of the error amplifier is given as $$Eo = Zf(i1+i2+i3+ \ldots +iN) \qquad (1)$$

It can also be shown that the output of the error amplifier is equal to the sum of the critical voltages (En) times the gain (Gn) of each loop to and including the error amplifier, so that $$Eo = E1*G1+E2*G2+E3*G3+ \ldots +EN*GN \qquad (2)$$

In a special case of the invention, all the critical points are considered of equal weight and are assigned equal loop impedances (hence equal loop gains). It can be shown that for this case it can be calculated and adjusted the error amplifier output according to $$Eo' = N*G*Eav*Ka \qquad (3)$$

where Eo' is the adjusted error amplifier output voltage, $G=G1=G2=G3= \ldots =GN$ is the gain of each loop, Eav is the average of all of the critical point voltages, N is the number of feedback loops, and Ka is a constant gain adjustment factor applied in the circuit to set DC gain and bandwidth of the power converter system. The value for Ka is set according to the gain and bandwidth desired for the system. Usually the default value for Ka is simply the net constant gain of the system in some reference band of frequencies, that is, whatever the value determined by the input and feedback impedances connected to the error amplifier. The value for Ka may also be the constant gain factor presented by an optical coupler isolator device used to couple a feedback signal from a secondary side of a converter to a primary side. Ka could be 1.0, greater than 1.0, or less than 1.0, but not zero, nor less than zero unless a negative sign is used to indicate the negative nature of the feedback.

The average adjusted system gain is then for the equal loop gains design case $$Gav = \frac{Eo'}{Eav} = N*G*Ka \qquad (4)$$

when Eav is not equal to zero.

This means that the converter can be controlled to compare the average of all of the critical points to its reference voltage to determine the amount of correction to be applied from the total feedback information.

In the case where different loop gains are set for each critical point, it can be shown that $$Gav' = \frac{(N*Ka')*(E1*G1+E2*G2+E3*G3+ \ldots +EN*GN)}{(E1+E2+E3+ \ldots +EN)} \qquad (5)$$

where Gav' is the average adjusted gain and Ka' is the constant gain adjustment factor for this design case. The sum of the voltages E1+E2+E3 . . . cannot be zero, and normally would not be zero, except at start-up or shut-down of the system when the error amplifier is not in control of the system.

Another way to write equation (5) is $$Gav' = (N*Ka')*(\text{weighted average individual loop gain}) \qquad (6)$$

The gain of each loop can be weighted according to the importance of its critical point being monitored relative to the other critical points.

A further aspect of the invention is that each loop impedance can be set to allow DC current as well as AC current to flow to the summing point. For example, a critical point, where it is important to feedback a DC level, would be designed not to block DC currents, so the currents (i1, i2, etc.) in equation (1) would contain DC as well as AC components. Conversely, if a certain critical point is to be monitored for AC fluctuations but it is not desired to monitor DC levels at this point, the loop impedance can be set to block the DC component. The signal from a critical point could also be filtered to remove any undesirable AC components above a certain frequency, thereby forming a slowed-response loop or even a DC averaging loop over an extended period of time. The filtering of undesirable AC components may be done through low-pass, high-pass, band-pass, or other filters as known by those skilled in the art. Conversely, the loop can be configured to respond to high frequency AC transients and block frequencies below a certain cut-off frequency.

Referring now in more detail to the drawing in which like numerical items refer to like parts, FIG. 1 shows a simplified block diagram schematic 100 of a typical application for a synchronous buck power converter with two feedback loops for easy understanding. It will be obvious to those skilled in the art that much more complex embodiments can be realized for many different converter types and designs with multiple feedback loops without departing from the scope of the invention. Although the principles of the invention are applicable to other types of power converters, the buck converter will be used in this description as an example. A buck converter efficiently converts a higher voltage (the input voltage) to a lower voltage (the output voltage) using fast switching elements so that a minimum of power is dissipated by the converter itself in the conversion process. Additional information on buck converters is contained in the U.S. Pat. No. 6,184,666, Buck Converter with Parallel Switches, issued on Feb. 6, 2001, which is incorporated herein in its entirety.

FIG. 1 shows a new type of buck converter where the converter is controlled by two feedback loops. The basic operation of the converter is as follows. The input voltage source V IN, 1 is fed to the high frequency semiconductor switch Q1, 4, where it is alternately applied through the switch to the inductor L1, 6, at a high frequency and a controlled duty cycle.

L1, 6 current increases at a linear rate as long as Q1, 4 is in the on or conducting state. The current in L1, 6, is applied to charge the filter and energy storage capacitor C1, 7. At the same time the load Z3, 9, is draining the capacitor through the power transmission line T1, 8, thus providing power to the load Z3, 9. The voltage on the load Z3, 9, is sensed by the feedback loop T2, 10, and Z2, 11, back to the control circuit, U1, 3, through the error amplifier EA, 13 (EA may be contained in the control circuit itself.)

When the voltage of the load Z3, 9, has reached its upper control voltage level, determined by VREF, 15, the control circuit U1, 3 turns off Q1, 4, through its drive output DH. After a short period of time, usually less than 100 nanoseconds, the lower switch Q2, 5 is turned on to maintain a continuous current flow in L1, 6, while Q1, 4 is in the off-state (non-conducting state.) A fast diode, not shown in FIG. 1, may be added to the circuit at the input end of L1, 6, at the junction of the source of Q1, 4, and drain of Q2, 5, to maintain continuous current flow during the short time when neither Q1, 4, nor Q2, 5 is in the on-state. Although, if MOSFET switches are used, the MOSFET switches contain this diode as a parasitic element in their physical structure so an extra diode in the circuit may not be needed.

The converter shown in FIG. 1 has a remote load sense capability, whereby the voltage at the load Z3, 9, is controlled through the transmission line T2, 10, and the loop impedance Z2, 11 which controls the gain of this loop.

A second and faster feed back loop is also shown in FIG. 1, and it consists of a lumped impedance combination network of C2, 16, with R3, 17 in series and R1, 18, in parallel with the two former elements. This loop feeds directly to a summing node input of the error amplifier EA, 13, and is therefore a much faster responding loop than the remote sense loop consisting of T2, 10 and Z2, 11. This second described loop is designed to be faster than the remote sense loop. The remote sense loop sensing load Z3, 9 is generally of slow response because of the delays caused by the transmission lines T1, 8, and T2, 10.

In the second loop, the capacitance C2, 16, when it is set to an appropriate value, together with R3, 17, and R1, 18, form a time constant for this loop impedance. The response of the second loop can be very fast and controls voltage fluctuations at the junction of L1, 6, and the input to T1, 8. This junction can be considered to be the output "terminals" of the converter for purposes of distinguishing between the output voltage at the converter "terminals" vs. the output voltage at the remote load, Z3, 9.

There may be many more loops in a circuit that employs a power converter and an input point, summing node 20, for the error amplifier summarizes delays in all the loops as represented in equation (2), wherein each element Ei*Gi represents influence of a loop i. In the example shown in FIG. 1, summing node 20 represents the delay of two above described loops. The value of R1 can be set to increase the DC portion of the signal at the converter terminals relative to the DC value of the signal at the remote load, Z3, 9. This way the converter terminal voltage and the remote load voltage can be averaged as the effective controlled voltage level, e.g., the load voltage can be allowed to be a little below nominal value (VREF, 15) so that the converter terminal voltage is not too high for other loads that may be much closer to the converter terminals.

Conversely, R1 can be removed from the circuit so that the second loop responds only to fast transients above or below the VREF, 15 voltage, and thus allowing much smoother control of the converter terminal voltage. In this case, C2, 16, and R3, 17, in series forms a differentiating signal loop where passes only transients above a cut-off frequency determined by the time constant of the loop. The lumped impedance could also comprise a low-pass filter, a high-pass filter, or a band-pass filter so that only selected frequencies are passed through the loop. The loop could also contain an intentional lumped inductance such as a ferrite bead or a coil or inductor to act as a low pass filter. C2, 16, when its value is properly set, also helps to provide a high frequency phase boost that improves the stability or phase margin of the converter. The resistor R2 can be used to adjust the overall gain and to set an output voltage that is higher than VREF, 15 as the actual controlled output voltage.

Note that the second feedback loop could also be configured as consisting only of R1, 18, in which case all frequencies and the DC signal present at the converter terminals are input to the summing node of the error amplifier. In this case the value of R1, 18, and the real part of Z2, 11, in parallel form a simple voltage divider with R2, 12, setting the DC voltage at the converter terminals and at the load Z3, 9.

In another embodiment, the invention is a DC to DC or an AC to DC power converter with voltage remote sensing that has an additional feedback loop(s) added for improved stability. The improved stability is obtained by an increase in phase margin with the additional loop(s). Bandwidth can also be increased by adding the same loop(s). The DC voltage at the output terminals of the converter can be sensed as well as the remote load(s) DC voltage(s) for stable operation at the optimum DC value. Alternately, the system can be configured to sense and adjust DC voltage at one or more points but still reacts to transients at other points sensed. The gain of each loop can be tailored according to the needs of the application without interfering with the basic feedback control method used by a particular type of converter.

Thus, in summary, the converter according to the invention can be controlled using signal data from one set of critical sense points, which are the converter terminals, or from another critical point, which is the remote load. It will be obvious to those skilled in the art that many possible combinations of feedback loops from various critical points can be monitored and used to control the converter, regardless of the type of power converter using the present invention.

Also it should be noted that it is not necessary to design a special control integrated circuit to use the invention. The invention can be applied to circuits with "off-the-shelf" standard controller integrated circuits. Conversely, the invention can integrated into a special integrated circuit designed for a specific application if there is a requirement for sensing various critical points in the converter system. It is also obvious that the invention is applicable to systems that require some form of feedback control.

Although various exemplary embodiments of the invention have been disclosed, it should be obvious to those skilled in the art that modifications and changes can be made that will achieve the advantages of the invention without departing from the scope of the invention.

What is claimed is:

1. An apparatus for sensing remote load voltages, comprising:
   a power converter;
   a plurality of remote loads, each remote load located in a loop connected to the power converter;
   a feedback loop connected to the power converter, the feedback loop being physically adjacent to the power converter, wherein the feedback loop further comprises a first path and a second path, and the first path and the second path are in parallel; and
   an error amplifier connected to the feedback loop;
      wherein the error amplifier has a gain defined by
      Gav=(N*Ka)*(weighted average individual loop gains), wherein;
      Gav is the average gain of the error amplifier,
      N is the number of loops, and
      Ka is a constant gain adjustment factor.

2. The apparatus of claim 1, wherein the first path further comprises a capacitor-resistor network.

3. The apparatus of claim 1, wherein the first path further includes a low-pass filter.

4. The apparatus of claim 1, wherein the first path further includes a high-pass filter.

5. The apparatus of claim 1, wherein the first path further includes a band-pass filter.

6. An apparatus for sensing remote load voltages, comprising:
   a power converter;
   a plurality of feedback loops, each respective feedback loop having a specified loop impedance relative to a desired loop gain and connected to an output terminal of the power converter at one end;
   a plurality of loads, each load situated in a respective feedback loop at a specified distance from the power converter;
   an error amplifier, including
      a first one of said plurality of feedback loops including a remote load,
      a second one of said plurality of feedback loops being in parallel with said first loop and being physically adjacent to said controller; said second one of said plurality of feedback loops being directly connected to a summing node input of the error amplifier;
   wherein each load has a critical voltage point and the error amplifier has an output equal to a sum of a plurality of critical voltage points times the gain of each feedback loop to and including the error amplifier, the error amplifier output being defined by $E0=Zf(i1+i2+i3+ \ldots +iN)$, wherein Zf is the impedance of a gain compensation network of the error amplifier,
   i is the current flowing through a feedback loop, and
   N represents the number feedback loops.

7. The apparatus of claim 6, wherein the plurality of loads include at least one of a nearby load, a remote load, a converter terminal voltage and an inductor terminal voltage.

8. The apparatus of claim 6, wherein the critical voltage point comprises one or more of a remote load, a nearby load, a converter terminal voltage, and an inductor terminal voltage.

9. The method of claim 6, wherein the impedance is set using a resistor-capacitor network.

10. The method of claim 6, wherein the impedance comprises a desired relative gain of each feedback loop.

11. The method of claim 6, wherein the impedance for each feedback loop comprises configuring a specific feedback loop response.

12. The method of claim 6, wherein each feedback loop has at least one critical point.

13. The method of claim 12, wherein the critical point comprises one or more of a remote load, a nearby load, a converter terminal voltage, and an inductor terminal voltage.

14. An apparatus for sensing remote load voltages, comprising:
   a power converter;
   a plurality of feedback loops, each respective feedback loop having a specified loop impedance relative to a desired loop gain and connected to an output terminal of the power converter at one end;
   a plurality of loads, each load situated in a respective feedback loop at a specified distance from the power converter;
   an error amplifier, including
      a first one of said plurality of feedback loops including a remote load,
      a second one of said plurality of feedback loops being in parallel with said first loop and being physically adjacent to said controller; said second one of said plurality of feedback loops being directly connected to a summing node input of the error amplifier;
   wherein the error amplifier has a gain defined by
      Gav=(N*Ka)*(weighted average individual loop gains), wherein
      Gav is the average gain of the error amplifier,
      N is the number of loops, and
      Ka is a constant gain adjustment factor.

15. The apparatus of claim 14, wherein the plurality of loads include at least one of a nearby load, a remote load, a converter terminal voltage, and or inductor terminal voltage.

16. The method of claim 14, wherein the impedance is set using a resistor-capacitor network.

17. The method of claim 14, wherein the impedance comprises a desired relative gain of each feedback loop.

18. The method of claim 14, wherein the impedance for each feedback loop comprises configuring a specific feedback loop response.

19. The method of claim 14, wherein each feedback loop has at least one critical point.

20. The method of claim 19, wherein the critical point comprises one or more of a remote load, a nearby load, a converter terminal voltage, or an inductor terminal voltage.

* * * * *